(12) United States Patent
Vandendoren

(10) Patent No.: US 11,465,907 B2
(45) Date of Patent: *Oct. 11, 2022

(54) PROCESS FOR PRODUCING A CONCENTRATED AQUEOUS SODIUM HYDROXIDE SOLUTION

(71) Applicant: SOLVAY SA, Brussels (BE)

(72) Inventor: Alain Vandendoren, Wezembeek-Oppem (BE)

(73) Assignee: Solvay SA, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/953,404

(22) Filed: Nov. 20, 2020

(65) Prior Publication Data

US 2021/0070620 A1    Mar. 11, 2021

Related U.S. Application Data

(63) Continuation of application No. 15/456,008, filed on Mar. 10, 2017, now abandoned, which is a (Continued)

(30) Foreign Application Priority Data

Nov. 12, 2013 (EP) .................................. 13192428

(51) Int. Cl.
  *C01D 1/00*   (2006.01)
  *C01D 1/42*   (2006.01)
  (Continued)

(52) U.S. Cl.
  CPC ................ *C01D 1/42* (2013.01); *C01D 1/22* (2013.01); *C01D 7/126* (2013.01); *C01D 7/14* (2013.01); *C01D 7/24* (2013.01); *C22B 26/10* (2013.01)

(58) Field of Classification Search
  CPC . C01D 7/24; C01D 7/14; C01D 7/126; C01D 1/42; C01D 1/22; C22B 26/10
  See application file for complete search history.

(56) References Cited

U.S. PATENT DOCUMENTS

| 2,446,868 A | 8/1948 | Cunningham |
| 3,184,287 A | 5/1965 | Gancy |

(Continued)

FOREIGN PATENT DOCUMENTS

| WO | WO 94/23074 A1 | 10/1994 |
| WO | WO 2010/072793 A1 | 7/2010 |

OTHER PUBLICATIONS

[Unknown Author] "Kostik Soda Üretim Ünitesi Projesi / Çevresel Etki Değerlendirme Raporu" (Caustic Soda Production Plant Project / Environmental Impact Assessment Report) submitted on Jul. 2013 by Dokay-Çed Çevre Mühendisliği Ltd. Şti for Project Owner Riotur Madencilik A. Ş., in Turkish language, 155 pages + including English Translation, 197 pg Document and translation in English loaded as 2 separate documents in EFS-Web.

(Continued)

*Primary Examiner* — Steven J Bos
(74) *Attorney, Agent, or Firm* — Osha Bergman Watanabe & Burton LLP

(57) ABSTRACT

A method for producing a concentrated aqueous sodium hydroxide solution from a purge stream deriving from a sodium carbonate, or sesquicarbonate, or wegsheiderite crystallizer, or sodium bicarbonate crystallizer, said purge stream comprising sodium carbonate and/or bicarbonate, and at least 1% of sodium chloride or sodium sulfate and a soluble impurity from an ore deposit comprising at least one of the following elements: As, Ba, B, Ca, Co, K, Li, Mo, P, Pb, Se, Sn, Sr, Te, Tl, Ti, V, and W, to be purified, the method comprising: causticizing at least 50 mol. % of the sodium carbonate into a caustic solution and into a calcium carbon- (Continued)

ate mud with lime and water; separating the mud from the caustic solution; concentrating the caustic solution by removing part of the water to obtain a concentrated caustic solution comprising at least 25% NaOH, and a crystallized solid comprising sodium carbonate and sodium chloride and/or sulfate; and separating the crystallized solid from the concentrated caustic solution, said crystallized solid to be disposed of or to be further valorized.

20 Claims, 2 Drawing Sheets

Related U.S. Application Data continuation of application No. 14/537,974, filed on Nov. 11, 2014, now Pat. No. 9,593,023.

(51) Int. Cl.
*C01D 1/22* (2006.01)
*C01D 7/12* (2006.01)
*C01D 7/24* (2006.01)
*C01D 7/14* (2006.01)
*C22B 26/10* (2006.01)

(56) References Cited

U.S. PATENT DOCUMENTS

| | | | |
|---|---|---|---|
| 4,115,219 | A | 9/1978 | Gancy |
| 4,288,419 | A | 9/1981 | Copenhafer et al. |
| 5,609,838 | A | 3/1997 | Neuman et al. |
| 6,589,497 | B2 | 7/2003 | Smith |
| 7,507,388 | B2 | 3/2009 | Ceylan et al. |
| 9,593,023 | B2 * | 3/2017 | Vandendoren ........... C01D 7/24 |
| 2003/0143149 | A1 | 7/2003 | Braman et al. |
| 2004/0057892 | A1 | 3/2004 | Kurtz |
| 2009/0291038 | A1 | 11/2009 | Davoine et al. |
| 2013/0156663 | A1 | 6/2013 | Walravens et al. |

OTHER PUBLICATIONS

Eggerman, Tim, "Sodium Hydroxide", in Kirk Othmer Encyclopedia, published online on Apr. 15, 2011 (16 pg.) by John Wiley & Sons (accessible online at https://onlinelibrary.wiley.com/doi/abs/10.1002/0471238961.1915040905070705.a01.pub2.

* cited by examiner

PROCESS FOR PRODUCING A CONCENTRATED AQUEOUS SODIUM HYDROXIDE SOLUTION

CROSS-REFERENCE TO RELATED APPLICATIONS

This application is a continuation application of U.S. application Ser. No. 15/456,008 filed on Mar. 10, 2017, which is itself a continuation application of U.S. application Ser. No. 14/537,974 filed on Nov. 11, 2014, which claims priority to European application No. 13192428.4 filed on Nov. 12, 2013, the whole content of these applications being incorporated herein by reference for all purposes.

TECHNICAL FIELD OF THE INVENTION

The invention relates more particularly to a method for treating and purifying a purge stream from a sodium carbonate crystallizer or from a sodium bicarbonate compound crystallizer, such method addressing the issue of impurities removal, while tightening purge flow. The invention enables to reduce sodium alkaline loss, reduce water loss, and improves up-stream and down-stream purge treatments.

The invention relates also to a process for producing a sodium carbonate salt or a sodium bicarbonate salt using such improved method.

BACKGROUND OF THE INVENTION

Sodium carbonate ($Na_2CO_3$), or soda ash, is one of the largest volume alkali commodities made worldwide with a total production in 2011 of 53 million tons. Sodium carbonate finds major use in the glass, chemicals, detergents industries, and also in the sodium bicarbonate production industry. The main processes for sodium carbonate production are the Solvay ammonia synthetic process, the ammonium chloride process, and sodium carbonate or bicarbonate ore-based processes.

Main exploited sodium carbonate or bicarbonate ores are mainly trona ore ($Na_2CO_3.NaHCO_3.2H_2O$), nahcolite ore ($NaHCO_3$) or natron ore (sodium carbonate decahydrate: $Na_2CO_3.10H_2O$). Most of those ore deposits may comprise also some Wegsheiderite ($Na_2CO_3.3NaHCO_3$).

Trona ore is a mineral that contains up to 99% sodium sesquicarbonate ($Na_2CO_3.NaHCO_3.2H_2O$). Trona-based soda ash is obtained from trona ore deposits in Green River (Wyoming), Turkey, China, and Kenya either by underground mechanical mining, or by solution mining, or by lake waters processing. The trona-based sodium carbonate from Wyoming comprised about 90% of the total U.S. soda ash production.

A typical analysis of the trona ore in Green River is as follows:

TABLE 1

| Constituent | Weight Percent |
| --- | --- |
| $Na_2CO_3$ | 43.4 |
| $NaHCO_3$ | 34.4 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |
| Organics | 0.3 |

Nahcolite ore is a mineral that contains up to 99% sodium bicarbonate ($NaHCO_3$). Nahcolite-based soda ash has been produced from nahcolite ore deposits in Piceance Creek (Colorado).

Sodium carbonate or bicarbonate ore deposits include beds of corresponding sodium carbonate or bicarbonate ores listed above, and include also halite (NaCl), and/or thenardite ($Na_2SO_4$), and/or glauberite ($Na_2SO_4.CaSO_4$) included within the sodium carbonate or bicarbonate ores beds or included in inter-beds layers. The quality of the ore and of its content in impurities varies, depending on its particular location in the stratum and according geographic location. Aside sodium chloride, and/or sodium sulfate, the deposits contain other soluble impurities such as potassium chloride, potassium sulfate, alkaline metal borate, and alkaline metal phosphates, and slightly soluble minerals such as: alkali metal and alkali earth metal silicates, aluminates, titanates, vanadates, metallic compounds and salts.

Sodium carbonate or bicarbonate ores comprise also organic impurities. Such impurities come from organic sediments that were captured during the formation of the deposits and that frequently have formed oil shales during geological aging. Those organic impurities may be present in the Sodium carbonate or bicarbonate ore and/or also present in inter-beds of the ore deposits.

Other "insoluble" or very slightly water-soluble mineral impurities found in sodium carbonate or bicarbonate ores deposits or in the shales beds are generally mixtures of different minerals; the most frequent of which are calcite, dolomite, pirssonite, zeolite, feldspar, clay minerals, iron/aluminium silicates, and calcium sulfate.

Two main techniques well known in the art are used to recover sodium carbonate or bicarbonate ores from ore deposits. The first technique is mechanical mining, also called conventional mining, such as a room and pillar panel operation or a longwall operation. The second technique is a solution mining recovering wherein the ore, such as trona or nahcolite, is dissolved with water and recovered as a solution.

Among the several ways in which sodium carbonate can be recovered from sodium carbonate or bicarbonate ores that contains other salts and impurities, the most widely practiced is the so called "monohydrate process". In that process a mined ore, such as trona ore, is crushed, then calcined into crude sodium carbonate, then leached with water, the resulting water solution is purified and fed to a crystallizer where pure sodium carbonate monohydrate crystals are crystallized. The monohydrate crystals are separated from the mother liquor and then dried into anhydrous sodium carbonate. Most of the mother liquor is recycled into the crystallizer. However, the soluble impurities contained in the ore, tend to accumulate in the mother liquor in the crystallizer. To avoid build up of soluble impurities, the mother liquor must be purged. The purge liquor, which represents important quantities for industrial monohydrate plants, is commonly sent to an evaporative pond, also called tailings pond. The significant quantity of alkali which is contained in the purge liquor is consequently lost. Moreover, the stocking of large quantities of purge liquors in evaporative ponds raise environmental problems, because of the scarce availability of new areas for stocking, and induces also water loss that is detrimental in arid regions.

Variants to produce sodium carbonate from a solution generated with sodium carbonate or bicarbonate ores, in particular from solution mining, are:

decomposing thermally (with steam) or calcine chemically (with caustic soda) the dissolved sodium bicarbonate of the solution to transform it into dissolved sodium carbonate, then evaporating the water in order to crystallize pure sodium carbonate monohydrate, or crystallizing refined sodium sesquicarbonate (sesqui) after adjusting sodium bicarbonate to sodium carbonate molar ratio of the solution, evaporating part of water, then calcining the refined sesqui into soda ash, or crystallizing refined sodium bicarbonate after adjusting sodium bicarbonate to sodium carbonate molar ratio of the solution using carbon dioxide, then calcining the refined sodium bicarbonate into soda ash.

In those variants, the soluble impurities contained in the sodium carbonate or bicarbonate ore, tend to accumulate also into the monohydrate, or the sesqui or the sodium bicarbonate crystallizers. To avoid the build up of impurities, the mother liquors must also be purged, raising the same environmental problems in evaporative ponds as the monohydrate process.

Sodium bicarbonate ($NaHCO_3$), aside sodium carbonate, is another important alkali product with a wide range of applications including human food, animal feed, flue gas treatment, and chemical industries. The production of sodium bicarbonate is currently almost entirely made by the carbonation of solid or aqueous solutions of sodium carbonate with gaseous $CO_2$ either produced in situ in the soda ash plants or purchased independently.

Several technical alternatives have been proposed to reduce the purge volume from soda ash plants.

U.S. Pat. No. 3,184,287 discloses a method for producing soda ash from trona, preventing the formation of an insoluble dissolution barrier on the face of underground trona deposit subjected to in situ solution mining, wherein a portion of a stream liquor from a sodium carbonate monohydrate crystallizer is mixed with slaked lime in a causticizer to produce an aqueous sodium hydroxide comprising 3 to 10% of NaOH which is recycled back to the in-situ dissolution of trona deposit to produce a sodium carbonate solution.

US2003/0143149 discloses a process for recovering sodium-based chemicals from sodium carbonate streams such as recycle, purge, and waste streams from sodium carbonate crystallizers, mine water, evaporative pond water and sodium carbonate decahydrate deposits. The sodium bicarbonate concentration from those streams is reduced into sodium carbonate by decarbonizing such streams with quick lime (CaO) or sodium hydroxide (NaOH) and the resulting stream is fed mainly back to a sodium carbonate monohydrate crystallizer, and the remainder of the resulting decarbonized stream is fed to a sodium carbonate decahydrate crystallizer, from which purified decahydrate is recovered and recycled to monohydrate crystallizer and a purge concentrated in impurity such as sodium sulfate is disposed off. Though the purge reduction factor of this process is limited, because when high concentration of impurities is reached, sodium carbonate and sodium sulfate forms decahydrated mixed salts. And if high amounts of sodium sulfate are recycled back to carbonate monohydrate crystallizer, they generate burkeite crystals ($Na_2CO_3.2Na_2SO_4$) that are detrimental to sodium carbonate monohydrate quality.

US2004/0057892 discloses a process for the production of sodium carbonate and bicarbonate, according to which a purge liquor from a monohydrate sodium carbonate crystallizer is introduced into a sodium carbonate decahydrate crystallizer and the purified decahydrate crystals are converted into sodium bicarbonate. It has been observed that this process is not efficient when the purge liquor, depending on the trona source, contains high levels of impurities. High level of sodium chloride in the purge liquor prevents smooth crystallization of sodium carbonate decahydrate, displacing the sodium carbonate heptahydrate and sodium sesqui concentration domains.

U.S. Pat. No. 7,507,388 discloses a process for the production of sodium carbonate and bicarbonate, from a pre-purified solution comprising bicarbonate which is first partially decarbonized and then used in both a sodium bicarbonate line and a sodium carbonate monohydrate line. The purge stream of the sodium carbonate monohydrate crystallizer is either sent into a mixed sodium carbonate decahydrate and sodium sesquicarbonate line wherein resulting filtrate is discarded as the final purge of the process or sent after dilution into a light soda ash line comprising an intermediate sodium bicarbonate carbonation step, the bicarbonate is separated from the filtrate, and this filtrate is also disposed as a final purge. The taught total amounts of generated purges (in streams 322 and 422) is 1.28 t of purges per ton of dense soda ash and corresponds to 6 to 15 weight percents of purged sodium carbonate per ton of produced dense soda ash, which represents considerable sodium carbonate loss.

US2009/0291038 (Solvay) discloses a process for the joint production of sodium carbonate and sodium bicarbonate crystals, according to which a solid powder derived from sodium sesquicarbonate such as calcined trona is dissolved in water, the resulting water solution is introduced into a crystallizer, wherein sodium carbonate crystals and a mother liquor are produced, part of the mother liquor is taken out of the crystallizer (purge of the sodium carbonate crystallizer) and is carbonized (carbonated) to produce valuable sodium bicarbonate crystals and a second mother liquor, the second mother liquor is optionally decarbonized (debicarbonated) and then sent to a storage pond or a tailings pond.

However, there is still a need in the sodium carbonate and bicarbonate industry, to be able to reduce impurities build-up and further reduce the purge volume and the loss of alkali in a simple way, without impairing operation conditions of the linked processes.

SUMMARY OF THE INVENTION

In the natural soda ash processes, a high NaCl content, and/or a high $Na_2SO_4$ content, in the crystallization section require substantial amounts of purge that represent losses in product (carbonate or bicarbonate) as well as storage space problems. In the past it was difficult to eliminate the chlorides or sulfates as they are soluble species present in the solutions that were handled.

Moreover when artisan in the art wanted to reduce the volumes of impurities purge, most often the soluble impurities concentrations rise to higher levels in the process loops, inducing less pure manufactured product as soda ash or its derivatives.

In the present invention, the purge stream from the process is causticized with lime (CaO) or hydrated lime ($Ca(OH)_2$) to form a dilute solution of caustic soda, for instance 10% NaOH solution, which still may contains 4.5% $Na_2CO_3$ and the NaCl, and $Na_2SO_4$. This caustic solution is subsequently evaporated to about 30% (up to 50%) NaOH in which case, because of the effect of common sodium ion concentration rise, about 90% of remaining $Na_2CO_3$, about 80% NaCl and most of $Na_2SO_4$ precipitates as solids and can be removed easily from the sodium hydroxide solution, reducing then the purge volume in chlorides and sulfates. This eliminates about 80% (up to 90% at 50% NaOH concentration) of the NaCl and part of the $Na_2SO_4$ as a solid with a substantially reduced amount of $Na_2CO_3$ (loss) down to a factor of about 2 to 10 in comparison to known prior art. In addition to the reduced amount of sodium carbonate losses, the buildup of several detrimental impurities which concentration would unavoidably increase when reducing the aqueous purge volumes in known processes in the art, is in present process reduced and even improved by synergy of the causticization, the concentration of the NaOH solution, and the separation of the crystallized solid formed during the concentration of the NaOH solution. This process limits therefore the rise of impurities concentration in manufactured sodium carbonate or bicarbonate. The NaOH solution can be recycled in the process (in particular in case of a solution mining based process) to calcine chemically the $NaHCO_3$ into sodium carbonate, or can also be sold (in this case concentrating up to 50% NaOH as a commercial grade) with decreased content of impurities comprising at least one of the following chemical elements: As, B, Ba, Be, Bi, Ca, Cl, Co, Cu, F, K, Li, Mg, Mo, P, Pb, S, Se, Si, Sn, Sr, Te, Tl, Ti, V, W.

Accordingly, the invention relates to a method for treating a purge stream derived from an anhydrous sodium carbonate crystallizer, or a sodium carbonate monohydrate crystallizer, or a sodium carbonate decahydrate crystallizer, or a sodium sesquicarbonate crystallizer, or a wegsheiderite crystallizer, or a sodium bicarbonate crystallizer, said purge stream comprising sodium carbonate and/or sodium bicarbonate and at least 1% by weight of a sodium salt selected among sodium chloride, sodium sulfate and mixtures thereof, the method comprising:
  causticizing at least 50, preferably at least 70; more preferably at least 85, and even more preferably at least 90 mol. % of the sodium from sodium carbonate and/or sodium bicarbonate,
  into an aqueous sodium hydroxide solution and
  into a calcium carbonate mud
  by reaction of the purge stream with lime, in presence of water;
  separating the calcium carbonate mud from the aqueous sodium hydroxide solution;
  concentrating the aqueous sodium hydroxide solution by removing part of the water in order to obtain:
  a concentrated aqueous sodium hydroxide solution comprising at least 25% NaOH, preferably at least 30% NaOH, more preferably at least 35% NaOH, even more preferably at least 40% NaOH, and most preferred at least 50% NaOH, and
  a crystallized solid comprising sodium carbonate and comprising sodium chloride and/or sulfate,
  wherein the weight ratio of sodium carbonate to the sum of the sodium chloride and/or sodium sulphate in the crystallized solid is at most 2, preferably at most 1.5, more preferably at most 1, even more preferably at most 0.6, and most preferred at most 0.4,
  separating the crystallized solid comprising sodium carbonate and sodium chloride and/or sulfate from the concentrated aqueous sodium hydroxide solution, said crystallized solid to be disposed of or to be further valorized,
  valorizing the concentrated aqueous sodium hydroxide solution as a salable sodium hydroxide solution or preferably in recycling at least one part of the concentrated aqueous sodium hydroxide solution to the anhydrous sodium carbonate crystallizer, or to the sodium carbonate monohydrate crystallizer, or to the sodium carbonate decahydrate crystallizer, or to the sodium sesquicarbonate crystallizer, or to the bicarbonate crystallizer, or to processes upstream of the anhydrous sodium carbonate crystallizer, or of the sodium carbonate monohydrate crystallizer, or of the sodium carbonate decahydrate crystallizer, or of the sodium sesquicarbonate crystallizer, or of the bicarbonate crystallizer.

A first advantage of the present invention is that it reduces considerably the amount of alkali loss to be stored in evaporative (or tailings) ponds.

A second advantage of present invention is that it is efficient in reducing sodium carbonate loss in purge treatments of both main sodium impurities of sodium carbonate ores or sodium bicarbonate ores which are sodium sulfate and/or sodium chloride.

A third advantage of the present invention is that it is also efficient to reduce a large spectrum of soluble impurities such as at least one of the following impurities: chlorides, fluorides, silicates, sulfates, phosphates, vanadates, titanates, and also potassium, in the purge or from mother liquors in at least one from: anhydrous sodium carbonate crystallizer, or a sodium carbonate monohydrate crystallizer, or a sodium carbonate decahydrate crystallizer, or a sodium sesquicarbonate crystallizer, or a wegsheiderite crystallizer, or a sodium bicarbonate crystallizer.

A fourth advantage of the present invention linked to the second and third advantage is that it enables to exploit one or several sodium carbonate ores deposits such as trona deposit or sodium bicarbonate ores deposit such as nahcolite with different levels of soluble impurities while being able to treat the varying levels of the purges of a soda ash or a sodium bicarbonate plant with the same process described in the present invention.

A fifth advantage of the present invention is that it enables to minimize the purge flow preparing the process for either dry-cooking the purge or for very small evaporative ponds or for reinjecting the purge into mined out cavities.

A sixth advantage of the present invention is that it enables to reduce water consumption for soda ash production and/or sodium bicarbonate production in recovering it as condensates from evaporators for either recycle it to a calcined carbonate or bicarbonate ore leaching or to a carbonate or bicarbonate ore solution mining, in particular to a calcined trona leaching or to a trona solution mining.

A seventh advantage of the present invention is that it enables to improve the operation of a sodium carbonate decahydrate crystallizer treating in a first step the purge of a sodium monohydrate crystallizer as high levels of sodium chloride or sodium sulfate is detrimental to the good crystallization of sodium carbonate decahydrate.

An eighth advantage of the present invention, is that it enables to improve also the operation of a sodium sesquicarbonate/decahydrate crystallizer treating in a first step the purge of a sodium monohydrate crystallizer, optionally operated before a causticization treatment of the purge, as high levels of sodium chloride or sodium sulfate is also detrimental to the good crystallization of sodium carbonate decahydrate.

A ninth advantage of the present invention, is that it enables to produce a technical caustic soda (NaOH) solution of constant low chloride and sulfate content from a sodium carbonate or bicarbonate ore deposit comprising variable content of chloride or sulfate salts such as halite (NaCl) or thenardite ($Na_2SO_4$), or soluble salts or soluble impurities from ore deposits comprising at least one element from: As, Ba, Be, Bi, B, Ca, Co, Cu, F, K, Li, Mg, Mo, P, Pb, Se, Si, Sn, Sr, Te, Tl, Ti, V, W. In this, the synergy is of particular interest, rendering possible a smooth operation of a sodium carbonate monohydrate crystallizer, or a sodium carbonate decahydrate crystallizer, or a sodium sesquicarbonate crystallizer, or a wegsheiderite crystallizer, or a sodium bicarbonate crystallizer, using sodium carbonate or bicarbonate ore deposits comprising variable content of chloride or sulfate salts, or salts of at least one above listed element, along with the production of a technical caustic soda solution of constant chloride and sulfate content.

Figure 1:
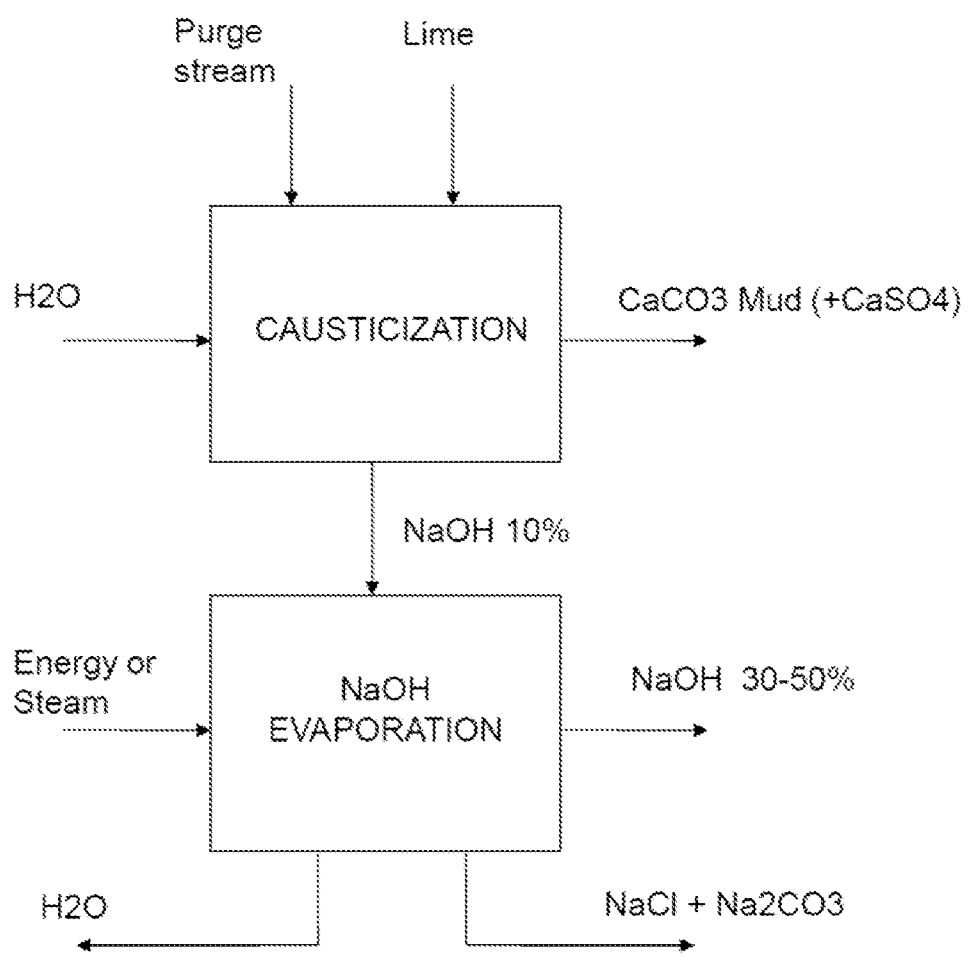
FIG. 1 is a flow diagram which schematically illustrates the method of the present invention.
Figure 2:
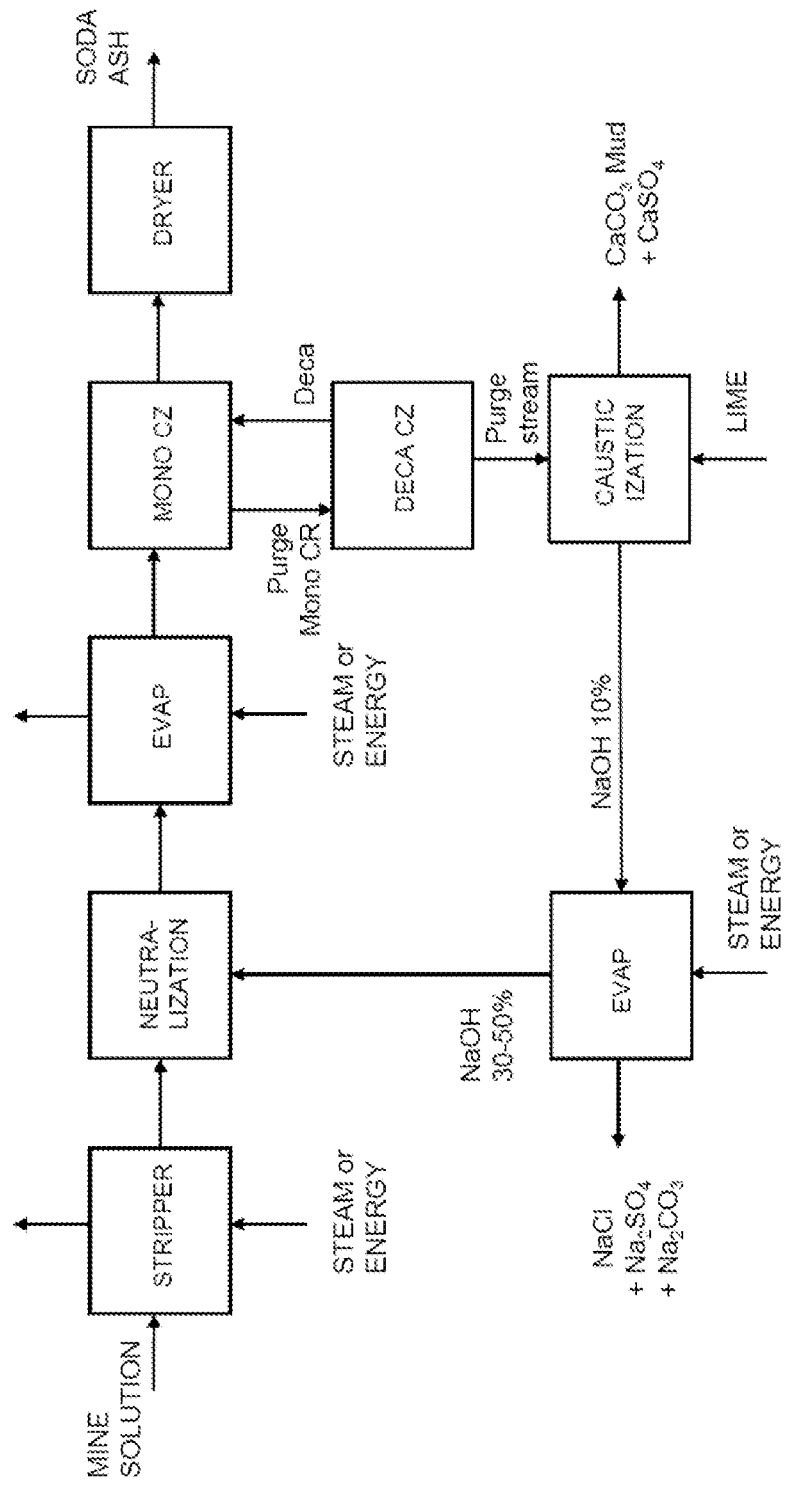
FIG. 2 is a flow diagram which schematically illustrates one embodiment of the present invention applied to the purge treatment of a sodium carbonate monohydrate crystallizer.

The reference figures and letters quoted below refer to the attached drawings.

DEFINITIONS

For purposes of the present description, certain terms are intended to have the following meanings.

The term "purge" refers to a stream withdrawn from a part of a process to limit impurity concentration in this process.

The expression "derived from" for instance "a purge stream derived from a sodium carbonate monohydrate crystallizer" refers to a stream withdrawn as such from said crystallizer, or to a stream that have been subjected to one or several chemical engineering operation downstream the said crystallizer (such as: centrifuging, crystallizing, filtering, evaporating, diluting, heating, cooling operations), or that has been mixed with one or more other stream(s), though keeping at least one chemical element withdrawn from said crystallizer.

The term "impurity" refers to a compound different from the sodium carbonate and/or the sodium bicarbonate salt to be produced.

The term "solubility" refers to the solubility of a compound in an aqueous solution.

The expression "total carbonate" refers to the carbonate and bicarbonate content. It may be expressed as total carbonate equivalent content.

The term "carbonating" refers to the action of increasing the amount of total carbonate (i.e. carbonate and bicarbonate) of a stream.

The term "decarbonating" refers to the action of decreasing the amount of total carbonate (i.e. carbonate and bicarbonate) of a stream.

The term "bicarbonating" refers to the action of increasing the amount of bicarbonate of a stream.

The term "debicarbonating" refers to the action of decreasing the amount of bicarbonate of a stream.

The expression "total alkalinity" of a stream refers to the alkalinity measured with hydrochloric acid 1N using methyl orange pH indicator down to orange color change (pH of about 3,1): total alkalinity comprises hydroxide ions (OFF), carbonate ions ($CO_3^-$), and bicarbonate ions ($HCO_3^-$), and it is expressed as equivalent $Na_2CO_3$ concentration.

Sodium carbonate derivatives in present description refer to compounds selected from: light soda ash, dense soda ash, sodium carbonate monohydrate, sodium carbonate heptahydrate, sodium carbonate decahydrate, sodium bicarbonate, sodium sesquicarbonate, wegscheiderite.

The term 'comprising' includes 'consisting essentially of' and also "consisting of".

In addition, if the term "about" is used before a quantitative value, the present teachings also include the specific quantitative value itself, unless specifically stated otherwise. As used herein, the term "about" refers to a +−10% variation from the nominal value unless specifically stated otherwise.

The sign '%' refers to 'weight %' unless specifically stated otherwise.

DETAILED DESCRIPTION

The present invention is described here after, in more detailed embodiments.

Item 1. A method for treating a purge stream derived from an anhydrous sodium carbonate crystallizer, or a sodium carbonate monohydrate crystallizer, or a sodium carbonate decahydrate crystallizer, or a sodium sesquicarbonate crystallizer, or a wegsheiderite crystallizer, or a sodium bicarbonate crystallizer, said purge stream comprising sodium carbonate and/or sodium bicarbonate and at least 1% by weight of a sodium salt selected among sodium chloride, sodium sulfate and mixtures thereof, the method comprising the following steps:
f) adding lime to the purge stream, in presence of water, so that to causticize at least 50 mol. % of the sodium from sodium carbonate and/or sodium bicarbonate, into an aqueous sodium hydroxide solution and into a calcium carbonate mud;
g) separating the calcium carbonate mud from the aqueous sodium hydroxide solution;
h) concentrating the aqueous sodium hydroxide solution by removing part of the water in order to obtain:
a concentrated aqueous sodium hydroxide solution comprising at least 25% NaOH, and
to crystallize a solid comprising sodium carbonate and comprising sodium chloride and/or sulfate,
wherein lime added at step f) and water removed at step h) are controlled so that the weight ratio of sodium carbonate to the sum of the sodium chloride and/or sodium sulfate in crystallized solid is preferably at most 2, preferably at most 1.5, more preferably at most 1, even more preferably at most 0.6, and most preferred at most 0.4,
i) separating the crystallized solid comprising sodium carbonate and sodium chloride and/or sulfate from the concentrated aqueous sodium hydroxide solution, said crystallized solid to be disposed of or to be further valorized,
j) valorizing the concentrated aqueous sodium hydroxide solution as a salable sodium hydroxide solution or preferably in recycling at least one part of the concentrated aqueous sodium hydroxide solution to the anhydrous sodium carbonate crystallizer, or to the sodium carbonate monohydrate crystallizer, or to the sodium carbonate decahydrate crystallizer, or to the sodium sesquicarbonate crystallizer, or to the bicarbonate crystallizer, or to processes upstream of the anhydrous sodium carbonate crystallizer, or of the sodium carbonate monohydrate crystallizer, or of the sodium carbonate decahydrate crystallizer, or of the sodium sesquicarbonate crystallizer, or of the bicarbonate crystallizer.

Item 2. The method of item 1, wherein at step f) at least 70 mol. % of the sodium from sodium carbonate and/or sodium bicarbonate is causticized.

Item 3. The method of item 1 or 2, wherein at step f) at least 85 mol. % of the sodium from sodium carbonate and/or sodium bicarbonate is causticized.

Item 4. The method of any items 1 to 3, wherein at step f) at least 90 mol. % of the sodium from sodium carbonate and/or sodium bicarbonate is causticized.

Item 5. The method of any items 1 to 4, wherein at step h) the concentrated aqueous sodium hydroxide solution comprises at least 30% NaOH.

Item 6. The method of any items 1 to 5, wherein at step h) the concentrated aqueous sodium hydroxide solution comprises at least 40% NaOH.

Item 7. The method of any items 1 to 6, wherein at step h) the concentrated aqueous sodium hydroxide solution comprises at least 50% NaOH.

Item 8. The method of any items 1 to 7, wherein at step h) the weight ratio of sodium carbonate to the sum of the sodium chloride and/or sodium sulfate in crystallized solid is at most 2.

Item 9. The method of any items 1 to 8, wherein at step h) the weight ratio of sodium carbonate to the sum of the sodium chloride and/or sodium sulfate in crystallized solid is at most 1.5.

Item 10. The method of any items 1 to 9, wherein at step h) the weight ratio of sodium carbonate to the sum of the sodium chloride and/or sodium sulfate in crystallized solid is at most 1.

Item 11. The method of any items 1 to 10, wherein at step h) the weight ratio of sodium carbonate to the sum of the sodium chloride and/or sodium sulfate in crystallized solid is at most 0.6.

Item 12. The method of any items 1 to 11, wherein at step h) the weight ratio of sodium carbonate to the sum of the sodium chloride and/or sodium sulfate in crystallized solid is at most 0.4.

Item 13. The method of any items 1 to 12, wherein the purge stream comprises $Na_2CO_3$ and/or $NaHCO_3$ in a quantity of at least 7% TA, advantageously at least 9% TA, preferably at least 10% TA, more preferably at least 13% TA (total alkalinity) expressed as equivalent $Na_2CO_3$.

Item 14. The method of any items 1 to 13, wherein the purge stream comprises at most 33% TA, more advantageously at most 22% TA, preferably at most 19% TA, more preferably at most 18% TA, even more preferably at most 16% $NaHCO_3$ TA (total alkalinity) expressed as equivalent $Na_2CO_3$.

Item 15. The method of any items 1 to 14, wherein the purge stream comprises at most 33% $Na_2CO_3$ or at most 16% $NaHCO_3$.

Item 16. The method of any items 1 to 15, wherein the purge stream comprises at most 15% NaCl or at most 10% $Na_2SO_4$.

Item 17. The method of any items 13 to 16, wherein the quantity of lime and of water present on step f) is controlled so that the aqueous sodium hydroxide solution comprises at least 6, preferably at least 8, more preferably at least 10% NaOH.

Item 18. The method of any items 1 to 17, wherein the quantity of lime and of water present on step f) is controlled so that the aqueous sodium hydroxide solution comprises at most 14, preferably at most 13, more preferably at most 11% NaOH.

Item 19. The method of any items 1 to 18, wherein the amount of water removed at step h) is controlled so that the concentrated aqueous sodium hydroxide solution comprises at most 7% NaCl and/or at most 2.5% $Na_2SO_4$.

Item 20. The method of any items 1 to 19, wherein the purge stream is a purge derived from a decahydrate sodium carbonate crystallizer, or from a sodium sesquicarbonate crystallizer.

Item 21. The method of item 20, wherein the decahydrate sodium carbonate crystallizer, or the sodium sesquicarbonate crystallizer are crystallizers wherein a purge from a sodium carbonate monohydrate crystallizer is treated in order to control the sodium chloride and/or the sodium sulfate of the sodium monohydrate crystallizer.

Item 22. The method of any items 1 to 21, wherein when the purge stream comprises sodium chloride, the causticizing of purge stream and the concentrating of the aqueous sodium hydroxide solution, result in a crystallized solid comprising sodium carbonate and sodium chloride in a weight ratio of at most 1.5, preferably at most 1.2, more preferably at most 1.0, most preferred 0.7 ton $Na_2CO_3$ per ton of NaCl.

Item 23. A method for producing a sodium carbonate salt or a sodium bicarbonate salt from a sodium carbonate/bicarbonate solution derived from a sodium carbonate/bicarbonate ore such as trona, nahcolite, and wegsheiderite ores, or from a sodium carbonate/bicarbonate lake water, or from a reclaimed solid, or from a mine water, said ores, waters or solid comprising sodium carbonate/bicarbonate, comprising the following steps:

a) optionally pre-treating the sodium carbonate/bicarbonate solution in removing part of organics and/or changing the carbonate/bicarbonate molar ratio in order to obtain an optional pre-treated sodium carbonate/bicarbonate solution;

b) crystallizing from the sodium carbonate/bicarbonate solution, or from the optionally pre-treated sodium carbonate/bicarbonate solution, a sodium carbonate salt or a sodium bicarbonate salt with one of the mean selected from the list of: evaporation crystallization, cooling evaporation, carbonation crystallization and combinations thereof, said crystallization step of the sodium carbonate salt or the sodium bicarbonate salt generating a mother liquor, said mother liquor comprising sodium carbonate or bicarbonate, sodium chloride or sodium sulfate, and water;

c) separating the sodium carbonate salt or the sodium bicarbonate salt from the mother liquor;

d) recycling part of the mother liquor back into one of the optional step a), or step b) and removing part of the mother liquor in order to generate a purge stream to control the sodium chloride and/or the sodium sulfate concentration in the mother liquor of the crystallization step b), e) treating the purge stream according to the method of any items 1 to 21.

Item 24. The method of item 23, wherein the sodium carbonate salt is sodium carbonate monohydrate,
and wherein the carbonate/bicarbonate solution is a trona ore solution mining solution and/or a trona ore mine water and/or a reclaimed solid comprising sodium carbonate,
said carbonate/bicarbonate solution comprising at least 10, preferably at least 12% total alkalinity expressed as sodium carbonate and comprising sodium chloride and/or sodium sulfate,
wherein:
    step a) comprises:
        a wet calcination in one or several steps for partly decarbonating the carbonate/bicarbonate solution to a sodium bicarbonate content of less than 5, preferably less than 4, more preferably less than 2.5 w % $NaHCO_3$, and
        a water evaporation operation to increase the total alkalinity of the carbonate/bicarbonate solution exiting step a) to at least 20, preferably at least 25% expressed as sodium carbonate, and a caustic calcination for further partly decarbonating the carbonate/bicarbonate solution to a sodium bicarbonate content of the carbonate/bicarbonate solution exiting step a) to less than 4, more preferably less than 2.5 w % NaHCO$_3$, using at least partly the sodium hydroxide from the concentrated aqueous sodium hydroxide solution;

step b) comprises crystallizing from the carbonate/bicarbonate solution exiting step a), a carbonate salt in the form of sodium carbonate monohydrate salt or a sodium carbonate anhydrous salt with one of the mean selected from the list of: evaporation crystallization, cooling evaporation;

step c) comprises separating the sodium carbonate (monohydrate or anhydrous) salt from the mother liquor of step b), and drying/calcining the sodium carbonate (monohydrate or anhydrous) salt into dried anhydrous sodium carbonate.

Item 25. The method of Item 24, wherein:

step e) comprises treating the purge stream to control the sodium chloride and/or the sodium sulfate concentration in the mother liquor of the crystallization step b), in three steps:

first, optionally, lowering sodium bicarbonate concentration of the purge stream by adding sodium hydroxide, to obtain at most 2, preferably at most 1, more preferably at most 0.4, most preferred at most 0.1 w % of sodium bicarbonate, second, crystallizing at least 20, preferably at least 30, more preferably at least 50% of the sodium carbonate from the purge stream into a sodium carbonate decahydrate crystallization step by cooling and/or evaporating water, separating the sodium carbonate decahydrate crystals from second mother liquor, and said sodium carbonate decahydrate crystals being recovered to be further processed as to recover the corresponding sodium carbonate such as recycling it at step a) or b), third, treating the second mother liquor as a new purge stream with the method of any items 1 to 20.

Item 26. The method of item 24, wherein:

step e) comprises treating the purge stream to control the sodium chloride or the sodium sulfate concentration in the mother liquor of the crystallization step b), in three steps:

first, optionally, partly carbonating the purge stream with carbon dioxide or with sodium bicarbonate addition to obtain 0.5 to 1.5 mole of sodium bicarbonate by mole of sodium carbonate, second, crystallizing by cooling or by water evaporation, or by carbonating, at least 20, preferably at least 30, more preferably at least 35% of the sodium carbonate from the purge stream into sodium sesquicarbonate, separating the sodium sesquicarbonate crystals from second mother liquor, and said sodium sesquicarbonate crystals are recovered to be further processed to recover the corresponding value of the sodium carbonate and sodium bicarbonate, third, treating the second mother liquor as a new purge stream with the method of items 1 to 20.

Item 27. The method of any items 1 to 22 wherein the calcium carbonate mud is further used for flue gas mitigation, or for agricultural soil amendment, or after an optional carbonation as board or paper filler.

Item 28. The method of any items 1 to 27, wherein the purge stream comprises at least one impurity of a soluble salt or at least one soluble impurity from ore deposits selected from: trona, nahcolite, or wegscheiderite ore, said soluble salt or soluble impurity comprising at least one element from: As, Ba, Be, Bi, B, Ca, Co, Cu, F, K, Li, Mg, Mo, P, Pb, Se, Si, Sn, Sr, Te, Tl, Ti, V, W, and wherein said soluble salt or soluble impurity is at least partially removed at step f) to i) from the purge stream.

Item 29. The method of item 28, wherein the at least one impurity of a soluble salt or at least one soluble impurity from ore deposits selected from: trona, nahcolite, or wegscheiderite ore, comprises at least one element from: Ca, Cl—, Cu, Pb, S, Se, Te, Tl that is at least removed at step h) to i) from the purge stream.

The method of present invention is efficient in treating variable concentrations of sodium chloride and/or sodium sulfate in the purge stream, such as high concentrations values encountered in pre-concentration of impurities in a decahydrate or a sesquicarbonate crystallizer pre-concentrating the purge from a sodium carbonate monohydrate crystallizer. Though too high concentrations of sodium chloride increase the density of suspension of the crystallized solid comprising sodium chloride and/or sulfate in the concentrated caustic soda solution. Therefore, preferably the purge stream comprises at most 15% NaCl or at most 10% Na$_2$SO$_4$.

In the present invention the lime is quick lime or hydrated lime. The causticizing of the sodium carbonate and/or sodium bicarbonate with quick lime (Calcium oxide CaO) or hydrated lime (Calcium hydroxide Ca(OH)$_2$) relates in presence of water mainly to the same overall chemical reaction. Indeed quick lime reacts rapidly with water to form hydrated lime (Ca(OH)$_2$). Causticization of carbonate ions or bicarbonate ions with lime in presence of water generates an hydroxide ions solution, according to the following reactions:

$$Na_2CO_3 + Ca(OH)_2 \rightarrow CaCO_3 + 2NaOH \quad [1]$$

$$NaHCO_3 + Ca(OH)_2 \rightarrow CaCO_3 + NaOH + H_2O \quad [2]$$

Therefore during causticization reaction, sodium carbonate and bicarbonate concentrations decrease and the sodium hydroxide concentration increase.

Moreover, part of sodium sulfate is also causticized by lime in presence of water according to the following reaction forming insoluble calcium sulfate and sodium hydroxide solution:

$$Na_2SO_4 + Ca(OH)_2 + 2H_2O \rightarrow CaSO_4 \cdot 2H_2O + 2NaOH \quad [3]$$

Though as calcium carbonate is less soluble than calcium sulfate, calcium sulfate in presence of sodium carbonate will partially dissolved and calcium will precipitated into calcium carbonate regenerating part of sodium sulfate.

When quick lime (calcium oxide CaO) is put in contact with water, calcium oxide reacts to form hydrated lime (calcium hydroxide Ca(OH)$_2$). The quick lime (calcium oxide) reaction with water is strongly exothermic. When an excess of water is used for hydrating quick lime, the obtained hydrated lime forms generally finely divided solid particles in suspension in water. Calcium hydroxide is slightly soluble in water (about 0.185 parts in weight for 100 parts of water). The suspension of the divided solid particles in water is generally called milk of lime.

In present invention, the lime (used directly in the causticization step when used as quick lime, or used before hydration to constitute the hydrated lime) should be of the highest possible quality, comprising preferably more than 90% CaO. The lime can be generated also on site by recycle and calcination of the washed $CaCO_3$ mud.

The quick lime or hydrated lime may comprise also magnesium oxide or magnesium hydroxide. Though because of the poor ability of magnesium hydroxide to be causticized with sodium carbonate or bicarbonate, and because of the poor filterability of the obtained calcium carbonate mud, comprising high amounts of magnesium hydroxide, it is preferred that the quick lime or hydrated lime comprises magnesium to calcium molar ratio of less than 0.2, more preferably less than 0.1 and most preferred less than 0.05 mol/mol.

In present invention the causticizing step is preferably operated with hydrated lime, more preferably with a milk of lime comprising hydrated lime.

In such embodiment using a milk of lime, the concentration of hydrated lime in the milk of lime, expressed in moles of $Ca(OH)_2$/liter of milk of lime is generally at least 0.5 mol/l, preferably at least 1.0 mol/l, more preferably at least 1.5 mol/l. The milk of lime comprises generally at most 7.0 mol/l, preferably at most 5.0 mol/l, more preferably at most 3.0 mol/l.

The removal of water from the aqueous sodium hydroxide solution consumes energy. Therefore there is little economic interest to produce a too diluted solution of aqueous sodium hydroxide solution, in using for instance a diluted milk of lime or a purge stream with high content of water.

Therefore it is advantageous in present invention that the water and lime amount be controlled at step f) so that the aqueous sodium hydroxide solution comprises at least 6, preferably at least 8, more preferably at least 10% NaOH.

Also the causticizing (or caustifying) rate expressed as the molar ratio of equivalent hydroxide ion reported to the sum of: equivalent carbonate (2 mole equivalents per mole of carbonate) plus the equivalent of bicarbonate ion (1 mole equivalent per mole of bicarbonate ion) plus the equivalent of sodium hydroxide ion (1 mole equivalent per mole of hydroxide ion), is dependant from the sodium hydroxide concentration, because of the low solubility of calcium hydroxide. In present invention it is advantageous that the water and lime amount be controlled at step f) so that the aqueous sodium hydroxide solution comprises at most 14, preferably at most 13, more preferably at most 11% NaOH.

Preferably in present invention, the purge stream is an aqueous solution. The total alkalinity (TA) of the purge stream is preferably around 16-17%. This enables to achieve caustification yields of about 85% and obtain a NaOH solution of about 10-11%. A higher total alkalinity results in higher final NaOH concentration, and therefore in lower energy consumption for water removal if done in an evaporation section, but lowers the caustification yield resulting in higher $Na_2CO_3$ losses in the crystallized solid during the concentration of the aqueous sodium hydroxide solution. A decrease in concentration (TA) of the purge stream will have the exact opposite effects. The economic optimum can be determined easily on each operating plant based on the respective costs of energy and feedstock (sodium carbonate/bicarbonate ore and lime).

The causticization temperature should be kept preferably above 95° C. in order to increase the velocity of the reaction but most of all, in order to precipitate the $CaCO_3$ in the form of calcite which is much easier to filtrate. A lower temperature will also favor the formation of pirsonite ($CaCO_3.Na_2CO_3.2H_2O$) leading to increased sodium losses with the caustification mud.

The calcium carbonate mud (hereafter 'the mud') is separated from the aqueous sodium hydroxide solution through settlers, or other means, then eventually a filtration step if needed for disposal or handling of the mud. The mud, comprising mostly $CaCO_3$, some unreacted CaO or $Ca(OH)_2$, precipitated impurities from the purge stream, and impregnating aqueous sodium hydroxide solution, can be disposed of in different ways.

The most preferable when possible is to recycle the mud in a sodium carbonate trona leach system where it will be mixed with the insolubles from a sodium carbonate/bicarbonate ore such as trona ore. This has the double advantage of avoiding the investment for a separation unit (filters) and for the disposal of the causticization mud. It has also the advantage of allowing the reaction of any of the unreacted CaO with the bicarbonate present in the leach liquor.

A second way is to separate the mud, filter it and wash it and then recycle it to a lime kiln, to produce the CaO for step 1 and eventually recover also pure $CO_2$ for any process that needs this feedstock (bicarbonate) or for sequestration if calcining mud is operated with indirect heating. The economics of each option will be dictated by the price of energy, $CO_2$, availability of cheap lime on the market.

A third way is to separate the mud, filter it and wash it and sell the calcium carbonate (for example as dry sorbent for $SO_2$ pollution control).

A fourth way is to separate the mud, filter it and store it in mine voids separately from sodium carbonate/bicarbonate ore insolubles, or in solution mining cavities.

A fifth but least preferred way is to separate the mud, filter it and store it on the surface (tailings pond).

In present method, most of sodium chloride and/or sodium sulfate of the purge stream are removed in the purge stream treatment.

The chloride ions are removed as sodium chloride solid precipitated during the concentration of the aqueous sodium hydroxide solution and subsequently separated from the concentrated aqueous sodium hydroxide solution.

Along with the treatment of the purge stream comprising chlorides and sulfates ions, the present method has shown a surprising efficient synergy of causticization steps f) and g) combined with steps h) and i) to remove along with NaCl and Na2SO4 from the purge stream other soluble compounds such as:

phosphates, silicates compounds removed with the calcium carbonate mud, and metallic ions either removed with the calcium carbonate mud or with the crystallized solid comprising sodium carbonate and sodium chloride and/or sulfate.

In present invention, the concentrating of the aqueous sodium hydroxide solution may be done by any known technology in the art, such as an evaporation unit selected from: a mechanical vapor recompression evaporator, a falling film evaporator, and multiple effect evaporation unit, preferably with steam thermo-compressors. The aqueous sodium hydroxide solution will be evaporated in order to obtain a concentrated sodium hydroxide solution of generally from 30% up to 50% in weight of NaOH. The level of evaporation will depend on the economics that are dictated by the investment needed, in particular as evaporators made in nickel alloys recommended above 25% NaOH, the energy cost, the amount of impurities to be eliminated and the usage of the caustic solution. The higher the concentration of NaOH, the lower the solubility in NaCl, $Na_2SO_4$, and $Na_2CO_3$, and most of metal hydroxides in the resulting caustic solution, and higher the quantity of impurities removed (precipitation of the above mentioned salts). For instance NaCl solubility in a concentrated sodium hydroxide solution is given below in table 2.

TABLE 2

| NaCl solubility in concentrated aqueous sodium hydroxide solution | | | | | | | | |
|---|---|---|---|---|---|---|---|---|
| NaOH aqueous solution concentration | g/kg | 100 | 250 | 300 | 350 | 400 | 450 | 500 |
| NaCl solubility | g/kg | 148 | 71 | 49 | 32 | 22 | 17 | 12 |

The sodium chloride remaining in the concentrated aqueous hydroxide solution can be controlled with the removal of water when concentrating the aqueous sodium hydroxide solution (from about 8% up to about 50 w % NaOH). In present invention it is advantageous to control water evaporation during sodium hydroxide concentration so that after removal of the crystallized solid comprising sodium carbonate and comprising sodium chloride and/or sulfate, the concentrated aqueous sodium hydroxide solution comprises at most 7, preferably at most 2, more preferably at most 1% NaCl and/or at most 2.5, preferably at most 1, more preferably at most 0.5% $Na_2SO_4$.

In operating the present method comprising both a causticizing step and a concentration of the aqueous hydroxide solution, one can reduce sensitively the loss of sodium carbonate finally purged with the sodium chloride and/or sodium sulfate. In particular when the purge stream comprises sodium chloride, it is advantageous that the causticizing rate of sodium carbonate or bicarbonate from purge stream with lime, and the water removal when concentrating the aqueous sodium hydroxide solution, be controlled so that the crystallized solid comprising sodium carbonate and sodium chloride be in a weight ratio of at most 1.5, preferably at most 1.2, more preferably at most 1.0, most preferred 0.7 ton $Na_2CO_3$ per ton of NaCl.

Indeed the more sodium carbonate is transformed into sodium hydroxide at step f) (that may be controlled for instance by lime addition, or causticization rate), the less sodium carbonate is present in the crystallized solid at step h) and i). Also the more water is withdrawn from the sodium hydroxide solution at step g), the more sodium chloride (and sulfate) is (are) removed as the crystallized solid at step i).

Such a method is particularly interesting as when the purge stream is a purge from a decahydrate sodium carbonate (deca) crystallizer or from a sodium sesquicarbonate (sesqui) crystallizer, the deca or sesqui crystallizer being itself a pre-treatment of a purge from a sodium carbonate monohydrate crystallizer to pre-concentrate the sodium chloride and or sodium sulfate. In that case, the loss of sodium carbonate in final purge (ie the 'crystallized solid' of present method) is reduced of a factor 1.5 to 3.0 when reported per ton of purged NaCl, enabling the recovery of generally at least 60%, or at least 70%, and up to at least 90% of the sodium carbonate present in the purge of the sodium carbonate monohydrate crystallizer.

Therefore, in an advantageous embodiment of present invention, the purge stream is a purge from a decahydrate sodium carbonate crystallizer, or from a sodium sesquicarbonate crystallizer. Even more advantageously the decahydrate sodium carbonate crystallizer or the sodium sesquicarbonate crystallizer can be crystallizers wherein a purge from a sodium carbonate monohydrate crystallizer is treated in order to control the sodium chloride and/or the sodium sulfate of the sodium monohydrate crystallizer. Indeed, the specific combination of a purge treatment from a monohydrate crystallizer, first in a decahydrate sodium carbonate crystallizer, or the sodium sesquicarbonate crystallizer, followed then with one of the methods described above of present invention, enables to produce a sodium carbonate monohydrate with low sodium chloride and/or sodium sulfate content, and then concentrating sodium chloride and/or sodium sulfate to constitute the purge stream of the present invention well-fitted for further steps of: causticization and removal of calcium carbonate mud, and then concentration of the previously obtained aqueous sodium hydroxide solution and separation of the crystallized solid comprising sodium carbonate and sodium chloride and/or sulfate from the concentrated aqueous sodium hydroxide solution. Though, when combining a purge treatment comprising a first step of sodium carbonate decahydrate crystallization and then the method of present invention, it is preferable to limit the sodium sulfate concentration in the decahydrate crystallizer solution to less than 10%, preferably less than 8% of $Na_2SO_4$ to avoid the crystallization of sodium sulfate decahydrate and to limit the formation of mixed salts of sodium carbonate and sodium sulfate.

The present invention relates also to a method for producing a sodium carbonate salt or a sodium bicarbonate salt from a sodium carbonate/bicarbonate solution derived from a sodium carbonate/bicarbonate ore such as trona, nahcolite, and wegsheiderite ores, or from a sodium carbonate/bicarbonate lake water, or from a reclaimed solid, or from a mine water, said ores, waters or solid comprising sodium carbonate/bicarbonate, comprising the following steps:

a) optionally pre-treating the sodium carbonate/bicarbonate solution in removing part of organics and/or changing the carbonate/bicarbonate molar ratio in order to obtain an optional pre-treated sodium carbonate/bicarbonate solution;

b) crystallizing from the sodium carbonate/bicarbonate solution, or from the optionally pre-treated sodium carbonate/bicarbonate solution, a sodium carbonate salt or a sodium bicarbonate salt with one of the mean selected from the list of: evaporation crystallization, cooling evaporation, carbonation crystallization and combinations thereof, said crystallization step of the sodium carbonate salt or the sodium bicarbonate salt generating a mother liquor, said mother liquor comprising sodium carbonate or bicarbonate, sodium chloride or sodium sulfate, and water;

c) separating the sodium carbonate salt or the sodium bicarbonate salt from the mother liquor;

d) recycling part of the mother liquor back into one of the step a), or step b) and removing part of the mother liquor in order to generate a purge stream to control the sodium chloride and/or the sodium sulfate concentration in the mother liquor of the crystallization step b);

e) treating the purge stream according to the method of claims 1 to 9.

In an advantageous embodiment of the above method for producing a sodium carbonate salt or a sodium bicarbonate salt, the sodium carbonate salt is sodium carbonate monohydrate, and the carbonate/bicarbonate solution is a trona ore solution mining solution and/or a trona ore mine water and/or a reclaimed solid comprising sodium carbonate, said carbonate/bicarbonate solution comprising at least 10, preferably at least 12% total alkalinity expressed as sodium carbonate and comprising sodium chloride and/or sodium sulfate, wherein:
step a) comprises:
a wet calcination in one or several steps for partly decarbonating the carbonate/bicarbonate solution to a sodium bicarbonate content of less than 5, preferably less than 4, more preferably less than 2.5 w % $NaHCO_3$, and a water evaporation operation to increase the total alkalinity of the carbonate/bicarbonate solution exiting step a) to at least 20, preferably at least 25% expressed as sodium carbonate, and a caustic calcination for further partly decarbonating the carbonate/bicarbonate solution to a sodium bicarbonate content of the carbonate/bicarbonate solution exiting step a) to less than 4, more preferably less than 2.5 w % $NaHCO_3$, using at least partly the sodium hydroxide from the concentrated aqueous sodium hydroxide solution;

step b) comprises crystallizing from the carbonate/bicarbonate solution exiting step a), a carbonate salt in the form of sodium carbonate monohydrate salt or a sodium carbonate anhydrous salt with one of the mean selected from the list of: evaporation crystallization, cooling evaporation;

step c) comprises separating the sodium carbonate (monohydrate or anhydrous) salt from the mother liquor of step b), and drying/calcining the sodium carbonate (monohydrate or anhydrous) salt into dried anhydrous sodium carbonate.

In a sub-embodiment of the advantageous embodiment of the above method for producing a sodium carbonate salt or a sodium bicarbonate salt, the step e) comprises treating the purge stream to control the sodium chloride and/or the sodium sulfate concentration in the mother liquor of the crystallization step b), in three steps:

first, optionally, lowering sodium bicarbonate concentration of the purge stream by adding sodium hydroxide, to obtain at most 2, preferably at most 1, more preferably at most 0.4, most preferred at most 0.1 w % of sodium bicarbonate, second, removing at least 20, preferably at least 30, more preferably at least 50% of the sodium carbonate from the purge stream by a sodium carbonate decahydrate crystallization step, wherein the sodium carbonate decahydrate crystals are separated from second mother liquor, and said sodium carbonate decahydrate crystals are recovered to be further processed as to recover the corresponding sodium carbonate, third, treating the second mother liquor as a new purge stream with the method of claims 1 to 8.

In a second sub-embodiment of the advantageous embodiment of the above method for producing a sodium carbonate salt or a sodium bicarbonate salt, the step e) comprises treating the purge stream to control the sodium chloride or the sodium sulfate concentration in the mother liquor of the crystallization step b), in three steps:

first, optionally, partly carbonating the purge stream with carbon dioxide to obtain 0.5 to 1.5 mole of sodium bicarbonate by mole of sodium carbonate, second, removing at least 20, preferably at least 30, more preferably at least 35% of the sodium carbonate from the purge stream by a sodium sesquicarbonate crystallization step, wherein the sodium sesquicarbonate crystals are separated from second mother liquor, and said sodium sesquicarbonate crystals are recovered to be further processed to recover the corresponding value of the sodium carbonate and sodium bicarbonate, third, treating the second mother liquor as a new purge stream with the method of claims 1 to 8.

The following examples are intended only to exemplify the invention and are not intended to limit the scope of the claimed invention.

EXAMPLES

Examples 1 and 2

The purge from a natural soda ash crystallizer, a monohydrate crystallizer operating at 101° C., comprising 27.3-30.3% $Na_2CO_3$, 2-5% NaCl, 0.5% $Na_2SO_4$ and minor impurities such as silicates (1500 ppm Si), phosphates (165 ppm P), aluminates (79 ppm Al), and organics (2300 ppm COD), is treated in a first step in a sodium carbonate decahydrate crystallizer operated at about 15-20° C. in order to recover part of sodium carbonate of the purge (the 'monohydrate purge') as sodium carbonate decahydrate and a purge stream (a 'decahydrate purge') comprising 17% $Na_2CO_3$, 8% NaCl, and 1.1% $Na_2SO_4$.

To this purge stream, lime comprising 95% CaO is added in a ratio of 9 t to 100 t of purge stream, with the addition also of 24 t of water, in a mixed reactor with a residence time of 1.5 hour and operated at 95° C., resulting into a suspension comprising an aqueous sodium hydroxide solution and a calcium carbonate mud.

Analyses of the resulting suspension show that: 85% of sodium carbonate is causticized in the aqueous sodium hydroxide solution (the caustic solution) and the caustic solution comprises: 10% NaOH, 2.3% $Na_2CO_3$, 7.2% NaCl, and 0.2% $Na_2SO_4$.

Analyses of the calcium carbonate mud and aqueous sodium hydroxide solution indicate that impurities such as silicates, and phosphates from the purge are extracted with the calcium carbonate mud and are sensitively decreased from a factor 1.5 to 10 in the caustic solution.

The caustic solution is then concentrated in an multiple effect evaporator to reach:

a concentrated aqueous sodium hydroxide solution (the concentrated caustic solution) of 30% NaOH for example 1, or 50% NaOH for example 2, and a crystallized solid comprising sodium carbonate, sodium chloride and sodium sulfate.

The corresponding flow and mass balance are given for:

example 1 with a concentrated caustic solution of 30% NaOH at table 3 example 2 with a concentrated caustic solution of 50% NaOH at table 4.

On can see in each example that the sodium carbonate in crystallized solid is reduced down to respectively:

for example 1: 0.64 t $Na_2CO_3$/t NaCl for example 2 and 0.57 t $Na_2CO_3$/t NaCl.

Those figures illustrate that the method of present invention:

eliminates 80% (example 1) and up to 90% (example 2) of the NaCl ($Na_2SO_4$ is similarly eliminated as NaCl with an even more important yield as sodium sulfate is partly precipitated at step f) plus at step h)) as a solid with a substantially reduced amount of $Na_2CO_3$ (loss) in the final purge constituted by the crystallized solid.

Moreover a comparison to previous known methods of purge treatment wherein the purge of monohydrate crystallizer is treated:

more than 80% to more than 90% of alkaline sodium (from sodium carbonate and bicarbonate of the purge) is recovered and may be recycled into the monohydrate crystallizer (or be valorized as caustic as salable liquor), comparatively the alkaline sodium recovery of purge treatment associating a sodium carbonate decahydrate crystallizer alone as described by US20050274678 is about 67%, comparatively the alkaline sodium recovery of purge treatment associating a sodium carbonate decahydrate crystallizer and a bicarbonate crystallizer as described by US2004057892 is about 70%, the loss of water is also sensitively decreased to less than 0.5 to 1 t water/t of sodium chloride purged. Comparatively, neither the decahydrate or the bicarbonate process can reduce the water losses per ton of NaCl purge which are about 9.5 t $H_2O$/t NaCl.

Therefore when the processed carbonate/bicarbonate ore, such as trona or nahcolite, or wegscheiderite, has an increased or fluctuating sodium chloride and/or sodium sulfate content, the method of present invention with a reduced amount of loss of sodium carbonate per ton of NaCl or per combined ton of NaCl+$Na_2SO_4$, remains particularly interesting compared to previous known methods.

Examples 3 to 6

Four purge stream samples comprising different levels of impurities, said purge streams deriving from sodium carbonate monohydrate crystallizers fed with sodium carbonate aqueous solutions fed from different parts of trona deposits in Green River, Wyo. USA, were selected.

The said monohydrate crystallizers operating conditions were similar to the ones described in 'Natural Soda Ash' from Donal E. Garrett, Van Nostrand Reinhold Editor, New York, 1992 at Chapter 8 'Monohydrate process' pp 267-299.

The selected four purge stream samples were analyzed and their content in main elements is listed in tables 5 to 8. The remaining of the purge stream composition is mainly water.

The $OH^-$, $CO_3^{2-}$ et $HCO_3^-$ were measured by potentiometry titration with chlorhydric acid (HCl) 1 mol/L (1 N), with determination of equivalence values by measuring derivative curve.

Cl— was measured by potentiometry titration with $AgNO_3$ 0.2 mol/L (0.2N) with also determination of equivalence values by measuring derivative curve.

All other elements were analyzed with standard method using inductively coupled plasma (ICP) atomic emission spectrometry, after dilution of the solution sample, acidification with HCl of the sample, filtration on 0.45 µm membrane, and the recovered solid was solubilized after alkaline fusion and redissolution in order to be complete on the related measured element.

The purge stream samples were then causticized in a stirred laboratory reactor at 95° C. during 2 hours after addition of quick lime at stoichiometric ratio with an excess of 15% of lime, in regards of the sodium carbonate and bicarbonate contents of the purge streams, and in regard of equations [1] and [2] listed supra in present specification. Previous to lime addition, water was optionally added so that the final sodium hydroxide concentration of the solution be about 10+/−1% by weight. During causticization, nitrogen gas ($N_2$) was continuously injected at a rate of about 50 L/h in the dome of the used 5 liters reactor, to avoid caustic solution carbonation with $CO_2$ of ambient air.

After 2 hours, where causticization of sodium carbonate/bicarbonate into sodium hydroxide and into a calcium carbonate mud took place, the reactor slurry was filtered with a stainless steel filter equipped with a Teflon membrane of 5 µm porosity to separate and obtain a sodium hydroxide solution (of about 10% NaOH concentration); and the calcium carbonate mud formed by the causticization of the purge stream was retained on the membrane of the filter.

Analyzes of the obtained aqueous sodium hydroxide solutions are given in respective tables 5 to 8 (columns 3).

The sodium hydroxide solutions were then concentrated:
to about 30-39% NaOH concentrated solution (examples 3 & 4) by placing the content of the reactor at 95° C. and under a vacuum of 600 mbar,
to about 43-46% NaOH concentrated solution (examples 5 & 6) by placing the content of the reactor at 115° C. and under a vacuum of 650 mbar, and by removing part of the water of the sodium hydroxide solution and following the amount of obtained condensates to stop the water evaporation when the targeted value of water condensates was obtained for a given final NaOH concentration.

The obtained suspensions, where part of: sodium chloride, sodium sulfate, and sodium carbonate were precipitated as solid during concentration of sodium hydroxide, were filtered to separate the concentrated NaOH solution that was recovered and analyzed, from the obtained precipitated solid. The used filter was heated at 95° C. and was equipped with a Teflon membrane of 5 µm porosity, and operated under pressure (at 1.5 bar), fed with nitrogen ($N_2$) gas to avoid carbonation of caustic solution.

The concentrated aqueous sodium hydroxide solutions thus obtained were analyzed in listed chemical elements and compared to the concentration of the solution in these elements before causticization and before caustic solution concentration. Analysis results are given on tables 5 to 8, along with the purification of impurities removal from purge solution expressed in weight %.

For the causticization solution (aqueous sodium hydroxide solution or 'Solution after steps f) to g)'), chlorides concentration (expressed as NaCl) was used as tracer to determine dilution/concentration factor with the original purge stream.

For the concentration/evaporation solution (concentrated aqueous sodium hydroxide solution or 'Solution after steps f) to i)'), hydroxide concentration (expressed as NaOH) was used as tracer to determine dilution/concentration factor compared to the aqueous sodium hydroxide solution or compared to the original purge stream solution.

The analysis results (column 4 of the tables) show that the causticization step f) and associated filtering step g) of the calcium carbonate (plus calcium sulfate) mud enables an effective purification of the purge stream in following impurities:
barium (Ba), beryllium (Be) bismuth (Bi), copper (Cu), magnesium (Mg), phosphor (P) expressed in phosphate, silica (Si), strontium (Sr), sulfur (S) expressed in sulfate, titanium (Ti), and to a lesser extent in arsenic (As), boron (B), potassium (K), lithium (Li), molybdenum (Mo).

The analysis results (columns 6 of tables 5 to 8) show that the concentration step h) with water evaporation of the caustic solution and crystallization of part of the sodium carbonate, sodium chloride and sodium sulfate salts, into a crystallized solid, followed then by the separation step i) of said crystallized solid from the concentrated aqueous sodium hydroxide solution, enable an effective purification of the purge stream in following impurities: calcium (Ca), chloride ($Cl^-$), copper (Cu), lead (Pb), sulfur (S) expressed as sulfate, selenium (Se), tellurium (Te), thallium (Tl) that are co-precipitated with the crystallized solid.

Therefore the combination of the overall steps f) to i) (see columns 7 of tables 5 to 8) enable to decrease the amount of impurities comprising at least one of the following chemical elements:
arsenic (As), barium (Ba), beryllium (Be), bismuth (Bi), boron (B), calcium (Ca), chloride (Cl⁻), copper (Cu), lead (Pb), lithium (Li), magnesium (Mg), molybdenum (Mo), nickel (Ni), phosphor (P) expressed as phosphate, potassium (K), selenium (Se), silica (Si), strontium (Sr), sulfur (S) expressed as sulfate, tellurium (Te), thallium (Tl), tin (Sn), titanium (Ti). Should the disclosure of any patents, patent applications, and publications which are incorporated herein by reference conflict with the description of the present application to the extent that it may render a term unclear, the present description shall take precedence.

TABLE 3

Example 1 - flow and mass balance - Purge treatment with NaOH concentrated to 30%.

| | | 1 Purge stream | 2 Lime | 3 $H_2O$ | 4 $CaCO_3$ Mud | 5 10% NaOH | 6 10% NaOH | 7 10% NaOH to EV | 8 Steam to EV | 9 Condensates from EV | 10 Purge NaCl out | 11 30% NaOH | 12 $H_2O$ Evap |
|---|---|---|---|---|---|---|---|---|---|---|---|---|---|
| $Na_2CO_3$ | t/h | 17 | | | | 2.5 | 0.2 | 2.3 | | | 1.9 | 0.3 | |
| NaCl | t/h | 8 | | | | 8 | 0.7 | 7.3 | | | 5.7 | 1.6 | |
| NaOH | t/h | | | | | 11 | 0.9 | 10.1 | | | 0 | 10.1 | |
| CaO | t/h | | 8.1 | | 0.4 | | | | | | | | |
| $CaCO_3$ | t/h | | | | 13.7 | | | | | | | | |
| $H_2O$ | t/h | 75.2 | | 24 | 8.2 | 88.5 | 7.5 | 81 | 26.8 | 58.6 | 3.7 | 21.5 | 27.7 |
| INERTS | t/h | | 0.4 | | 0.4 | | | | | | | | |
| Total | t/h | 100.0 | 9.0 | | 23.0 | 110.0 | 9.0 | 101.0 | 27.0 | 59.0 | 11.0 | 34.0 | 28.0 |
| $Na_2CO_3$ | % | 17 | | | | 2.3 | 2.3 | 2.3 | | | 17.1 | 1 | |
| NaCl | % | 8 | | | | 7.2 | 7.2 | 7.2 | | | 50 | 4.9 | |
| NaOH | % | | | | | 10 | 10 | 10 | | | | 30 | |
| CaO | % | | 95 | | 1.8 | | | | | | | | |
| $CaCO_3$ | % | | | | 60.3 | | | | | | | | |
| $H_2O$ | % | 75 | | 100 | 36 | 80.5 | 80.5 | 80.5 | 100 | 100 | 32.9 | 64.1 | 100 |
| INERTS | % | | 5 | | 1.9 | | | | | | | | |

TABLE 4

Example 2 - flow and mass balance - Purge treatment with NaOH concentrated to 50%

| | | 1 Purge stream | 2 Lime | 3 $H_2O$ | 4 $CaCO_3$ Mud | 5 10% NaOH | 6 10% NaOH | 7 10% NaOH to EV | 8 Steam to EV | 9 Condensates from EV | 10 Purge NaCl out | 11 50% NaOH | 12 $H_2O$ Evap |
|---|---|---|---|---|---|---|---|---|---|---|---|---|---|
| Na2CO3 | t/h | 17.0 | | | | 2.6 | 0.2 | 2.4 | | | 2.4 | 0.0 | |
| NaCl | t/h | 8.0 | | | | 8.0 | 0.7 | 7.3 | | | 7.0 | 0.3 | |
| NaOH | t/h | | | | | 10.8 | 0.9 | 9.9 | | | 0.0 | 9.9 | |
| CaO | t/h | | 8.0 | | 0.4 | | | | | | | | |
| $CaCO_3$ | t/h | | | | 13.5 | | | | | | | | |
| $H_2O$ | t/h | 74.9 | | 22.6 | 8.1 | 87.0 | 7.5 | 79.5 | 31.5 | 68.9 | 4.6 | 9.6 | 32.5 |
| INERTS | t/h | | 0.4 | | 0.4 | | | | | | | | |
| Total | t/h | 100 | 8.4 | 22.6 | 22.4 | 108.4 | 9.3 | 99.1 | 31.5 | 68.9 | 14.0 | 19.8 | 32.5 |
| $Na_2CO_3$ | % | 17.0 | | | | 2.4 | 2.4 | 2.4 | | | 16.8 | 0.2 | |
| NaCl | % | 8.0 | | | | 7.4 | 7.4 | 7.4 | | | 50.0 | 1.5 | |
| NaOH | % | | | | | 10.0 | 10.0 | 10.0 | | | | 50.0 | |
| CaO | % | | 95.0 | | 1.8 | | | | | | | | |
| $CaCO_3$ | % | | | | 60.3 | | | | | | | | |
| $H_2O$ | % | 75.0 | | 100.0 | 36.0 | 80.2 | 80.2 | 80.2 | 100.0 | 100.0 | 33.2 | 48.3 | 100.0 |
| INERTS | % | | 5 | | 1.9 | | | | | | | | |

TABLE 5

Example 3 - Solution analysis and percentages of impurities reductions in solutions:

| Test Example 3 Solutions analysis | Purge stream solution | Solution after steps f) to g) | impurity reduction in solution after steps f) to g) (based on ΔNaCl) | Solution after steps f) to i) | impurity reduction in solution after steps h) to i) (based on ΔNaOH) | overall impurity reduction in solution after steps f) to i) |
|---|---|---|---|---|---|---|
| Concentration | g/kg | g/kg | % | g/kg | % | % |
| NaOH | 0 | 94 |  | 305 |  |  |
| Na2CO3 | 163 | 48 |  | 28 | 82 |  |
| NaHCO3 | 11 | 0 |  | 0 |  |  |
| NaCl | 44 | 49 |  | 53 | 66 | 66 |
| Concentration | mg/kg | mg/kg reported to 10% NaOH | % | mg/kg reported to 30% NaOH | % | % |
| Ba | 2.1 | <0.11 | >95 | <0.17 |  | >95 |
| Ca | 2.3 | 90.0 |  | 19.3 | 93 | 93 |
| Li | 13 | 11 | 26 | 37.3 |  | 26 |
| Mg | 2.5 | 0.9 | 69 | 2.4 | 16 | 74 |
| Na | — | 115624 |  | 263636 | 30 | 30 |
| P as PO4 | 1237 | 75 | 95 | 319 |  | 95 |
| Pb | 0.6 | <1.1 |  | 2.4 |  | — |
| S as SO4 | 15788 | 18101 |  | 6684 | 89 | 89 |
| Si | 545 | 329 | 46 | 187 | 82 | 91 |
| Sr | 0.10 | <0.1 | >7 | 0.17 | <52 | <56 |
| Ti | 0.02 | <0.2 |  | 0.34 | <52 | <52 | steps f) to g): causticization & solid separation
steps h) to i): concentration – evaporation/separation
steps f) to i): causticization/separation, +concentration – evaporation/separation.

TABLE 6

Example 4 - Solution analysis and percentages of impurities reductions in solutions:

| Test Example 4 Solutions analysis | Purge stream solution | Solution after steps f) to g) | impurity reduction in solution after steps f) to g) (based on ΔNaCl) | Solution after steps f) to i) | impurity reduction in solution after steps h) to i) (based on ΔNaOH) | overall impurity reduction in solution after steps f) to i) |
|---|---|---|---|---|---|---|
| Concentration | g/kg | g/kg | % | g/kg | % | % |
| NaOH | 0 | 88 |  | 392 |  |  |
| Na2CO3 | 156 | 59 |  | 24 | 91 |  |
| NaHCO3 | 13 | 0 |  | 0 |  |  |
| NaCl | 44 | 47 |  | 31 | 85 | 85 |
| Concentration | mg/kg | mg/kg reported to 10% NaOH | % | mg/kg as it | % | % |
| Ag | 0.05 | <0.02 | >63 | <0.04 |  | >63 |
| As | 7.7 | 7.8 | 5 | 31.4 | 10 | 14 |
| B | 295 | 300 | 5 | 1160 | 13 | 17 |
| Ba | 3.3 | 0.03 | 99 | 0.04 | 70 | 99.7 |
| Bi | 1.6 | <0.2 | >89 | <0.40 |  | >89 |
| Ca | 2.3 | 8.6 |  | 5.9 | 85 | 85 |
| Co | 1.3 | 0.12 | 91 | 1.24 |  | 91 |
| Cu | 1.4 | 0.5 | 67 | <0.20 |  | 67 |
| K | 2860 | 3065 |  | 12360 | 9 | 9 |
| Li | 12.3 | 11.2 | 15 | 47.4 | 5 | 19 |
| Na | 93000 | 95000 |  | 238000 | 44 | 44 |
| P as PO4 | 1290 | 120 | 91 | 460 | 14 | 92 |
| Pb | 0.6 | 0.7 |  | 1.9 | 42 | 42 |
| S as SO4 | 13500 | 14570 |  | 4300 | 93 | 93 |
| Sb | 1.5 | 1.4 | 14 |  |  | 14 |
| Se | 2.4 | 2.4 | 5 | 9.2 | 13 | 18 |
| Si | 650 | 565 | 19 | 1970 | 22 | 36 |
| Sr | 1.4 | 0.02 | 99 | <0.02 | >78 | 99.7 |
| Te | 1.6 | 1.4 | 19 | 6.2 | 2 | 20 |

TABLE 6-continued

Example 4 - Solution analysis and percentages of impurities reductions in solutions:

| | | | | | | |
|---|---|---|---|---|---|---|
| Ti | 0.19 | 0.05 | 75 | | | 75 |
| Tl | 1.6 | 1.6 | 5 | 0.5 | 93 | 94 |
| W | 0.56 | 0.54 | 10 | | | 10 | steps f) to g): causticization & solid separation
steps h) to i): concentration – evaporation/separation
steps f) to i): causticization/separation, +concentration – evaporation/separation.

TABLE 7

Example 5 - Solution analysis and percentages of impurities reductions in solutions:

| Test Example 5 Solutions analysis | Purge stream solution | Solution after steps f) to g) | impurity reduction in solution after steps f) to g) (based on ΔNaCl) | Solution after steps f) to i) | impurity reduction in solution after steps h) to i) (based on ΔNaOH) | overall impurity reduction in solution after steps f) to i) |
|---|---|---|---|---|---|---|
| Concentration | g/kg | g/kg | % | g/kg | % | % |
| NaOH | 0 | 118 | | 437 | | |
| Na2CO3 | 174 | 39 | | 14 | 91 | |
| NaHCO3 | 16 | 0 | | 0 | | |
| NaCl | 29 | 32 | | 23 | 80 | 80 |
| Concentration | mg/kg | mg/kg reported to 12% NaOH | % | mg/kg reported to 44% NaOH | % | % |
| As | 4.9 | 4.7 | 12 | | | 12 |
| B | 163 | 141 | 22 | | | 22 |
| Ba | 5.9 | 0.11 | 98 | 0.06 | 86 | 100 |
| Ca | 2.2 | 17.6 | | 21.7 | 66 | 66 |
| K | 1900 | 1368 | 35 | | | 35 |
| Li | 10 | 7.0 | 37 | | | 37 |
| Mg | 3.0 | 0.80 | 76 | | | 76 |
| Mo | 18 | 18.1 | 9 | | | 9 |
| P en PO4 | 930 | 53 | 95 | 147 | 24 | 96 |
| Pb | 0.3 | <0.6 | | 1.3 | 45 | 45 |
| S en SO4 | 15100 | 14200 | | 3200 | 94 | 94 |
| Sb | 0.4 | 0.37 | 16 | 1.07 | 22 | 34 |
| Se | 0.5 | 0.8 | | 1.5 | 48 | 48 |
| Si | 152 | 237 | | 799 | 8 | 8 |
| Sn | <0.3 | <0.6 | | <1.0 | | |
| Sr | 0.2 | 0.07 | 67 | <0.04 | >85 | >95 |
| Te | <0.4 | 0.4 | | 0.8 | 51 | 51 | steps f) to g): causticization & solid separation
steps h) to i): concentration – evaporation/separation
steps f) to i): causticization/separation, +concentration – evaporation/separation.

TABLE 8

Example 6 - Solution analysis and percentages of impurities reductions in solutions:

| Test Example 6 Solutions analysis | Purge stream solution | Solution after steps f) to g) | % impurity reduction in solution after steps f) to g) (based on ΔNaCl) | Solution after steps f) to i) | % impurity reduction in solution after steps h) to i) (based on ΔNaOH) | % overall impurity reduction in solution after steps f) to i) |
|---|---|---|---|---|---|---|
| Concentration | g/kg | g/kg | % | g/kg | | % |
| NaOH | 0 | 111 | | 460 | | |
| Na2CO3 | 171 | 28 | | 11 | 90 | |
| NaHCO3 | 17 | 0 | | 0 | | |
| NaCl | 36 | 35 | | 29 | 80 | 80 |

TABLE 8-continued

Example 6 - Solution analysis and percentages of impurities reductions in solutions:

| Concentration | mg/kg | mg/kg reported to 11% NaOH | % | mg/kg as it | % | % |
|---|---|---|---|---|---|---|
| Al | <0.3 | 8.2 | | 31 | 9 | 9 |
| As | 6.2 | 5.4 | 10 | 18 | 23 | 31 |
| B | 176 | 169 | 2 | 560 | 20 | 22 |
| Ba | 7.6 | 0.13 | 98 | <0.03 | >94 | 99.9 |
| Be | 1.5 | 0.63 | 58 | 2.4 | 9 | 62 |
| Bi | 1.8 | <0.8 | 54 | <0.8 | | 54 |
| Ca | 2.2 | 17 | | 19 | 73 | 73 |
| Cd | <0.08 | <0.08 | | <0.08 | | |
| Co | 1.6 | 0.12 | 92 | 0.52 | | 92 |
| Cu | 1.5 | 1.18 | 19 | <0.24 | >95 | >96 |
| K | 1929 | 1893 | | 6187 | 21 | 21 |
| Li | 12 | 9.0 | 21 | 32 | 15 | 33 |
| Mg | 3.3 | 0.66 | 79 | 2.5 | 9 | 81 |
| Mo | 21 | 21 | | 64 | 25 | 25 |
| P en PO4 | 995 | 43 | 96 | 114 | 37 | 97 |
| Pb | <0.8 | <0.81 | | 1.2 | 63 | 63 |
| S en SO4 | 20600 | 17800 | | 3900 | 95 | 95 |
| Sb | 2.0 | 1.15 | 42 | 3.6 | 25 | 56 |
| Se | 2.7 | 2.5 | 4 | 1.1 | 90 | 90 |
| Si | 788 | 201 | 74 | 552 | 34 | 83 |
| Sn | 1.0 | 1.5 | | 4.2 | 35 | 35 |
| Sr | 1.8 | 0.09 | 95 | 0.06 | 85 | 99 |
| Te | 2.1 | 2.0 | | 0.7 | 92 | 92 |
| Tl | 2.2 | 1.8 | 15 | 0.6 | 93 | 94 |
| V | 5.3 | 5.6 | | 21 | 11 | 11 | steps f) to g): causticization & solid separation
steps h) to i): concentration – evaporation/separation
steps f) to i): causticization/separation, +concentration – evaporation/separation.

I claim:

1. A method for producing a concentrated aqueous sodium hydroxide solution from a purge stream derived from an anhydrous sodium carbonate crystallizer, or a sodium carbonate monohydrate crystallizer, or a sodium carbonate decahydrate crystallizer, or a sodium sesquicarbonate crystallizer, or a wegsheiderite crystallizer, or a sodium bicarbonate crystallizer, said purge stream comprising:
   sodium carbonate and/or sodium bicarbonate from a sodium carbonate or sodium bicarbonate ore deposit selected from the group consisting of: trona ore, nahcolite ore, and wegscheiderite ore,
   at least 1% by weight of a sodium salt selected from the group consisting of sodium chloride, sodium sulfate and mixtures thereof, and
   at least one soluble salt or at least one soluble impurity from said sodium carbonate or sodium bicarbonate ore deposit, said soluble salt or soluble impurity comprising at least one of the following elements selected from the group consisting of: As, Ba, B, Ca, Co, K, Li, Mo, P, Pb, Se, Sn, Sr, Te, Tl, Ti, V, and W,
   said concentrated aqueous sodium hydroxide solution comprising:
   at least 25% by weight of NaOH,
   said method comprising the following steps:
   f) adding lime to the purge stream, in presence of water, to causticize at least 50 mol. % of the sodium from sodium carbonate and/or sodium bicarbonate, into an aqueous sodium hydroxide solution and into a calcium carbonate mud;
   g) separating the calcium carbonate mud from the aqueous sodium hydroxide solution;
   h) concentrating the aqueous sodium hydroxide solution by removing part of the water to obtain:
   the concentrated aqueous sodium hydroxide solution comprising at least 25% NaOH, and to crystallize a solid comprising sodium carbonate and comprising sodium chloride and/or sulfate,
   i) separating the crystallized solid comprising sodium carbonate and sodium chloride and/or sulfate from the concentrated aqueous sodium hydroxide solution;
   j) valorizing the concentrated aqueous sodium hydroxide solution as a salable sodium hydroxide solution or recycling at least one part of the concentrated aqueous sodium hydroxide solution to the anhydrous sodium carbonate crystallizer, or to the sodium carbonate monohydrate crystallizer, or to the sodium carbonate decahydrate crystallizer, or to the sodium sesquicarbonate crystallizer, or to the sodium bicarbonate crystallizer, or to processes upstream of the anhydrous sodium carbonate crystallizer, or of the sodium carbonate monohydrate crystallizer, or of the sodium carbonate decahydrate crystallizer, or of the sodium sesquicarbonate crystallizer, or of the sodium bicarbonate crystallizer;
   and wherein the at least one soluble salt or the at least one soluble impurity comprising at least one element selected from the group consisting of: As, Ba, Be, Bi, B, Ca, Co, Cu, F, K, Li, Mo, P, Pb, Se, Sn, Sr, Te, Tl, Ti, V, and W,
   is at least partially removed at steps f) to i) from the purge stream.

2. The method of claim 1 wherein the at least one soluble salt or the at least one soluble impurity from the trona ore deposit or from the nahcolite ore deposit, comprises at least one element selected from the group consisting of: Ca, Cl, Cu, Pb, S, Se, Te, Tl that is at least partially removed at steps h) to i) from the purge stream.

3. The method of claim 1 wherein at least 66% of sodium chloride present in the purge stream is removed at steps f) to i) in the concentrated aqueous sodium hydroxide solution.

4. The method of claim 1 wherein at least 89% of sulfur expressed as sulfate present in the purge stream is removed at steps f) to i) in the concentrated aqueous sodium hydroxide solution.

5. The method of claim 1 wherein at least 74% of Mg (magnesium) element from the at least one soluble salt or the at least one soluble impurity from the trona ore deposit or the nahcolite ore deposit and present in the purge stream is removed from steps f) to i) in the concentrated aqueous sodium hydroxide solution.

6. The method of claim 1 wherein at least 92% of P (phosphorus) element from the at least one soluble salt or the at least one soluble impurity from the trona ore deposit or the nahcolite ore deposit and present in the purge stream is removed from steps f) to i) in the concentrated aqueous sodium hydroxide solution.

7. The method of claim 1 wherein the concentrated aqueous sodium hydroxide solution comprises at least 114 mg P and at most 460 mg P expressed as PO4/kg.

8. The method of claim 1 wherein the concentrated aqueous sodium hydroxide solution comprises at least 187 mg Si/kg and at most 1970 mg Si/kg.

9. The method of claim 1 wherein the concentrated aqueous sodium hydroxide solution comprises at least 3200 mg S and at most 6684 mg S expressed as SO4/kg.

10. The method of claim 1, wherein at step h) the weight ratio of sodium carbonate to the sum of the sodium chloride and/or sodium sulfate in crystallized solid is at most 2.

11. The method of claim 1, wherein at step f) the lime is hydrated lime, or a milk of lime comprising hydrated lime.

12. The method of claim 1, wherein, at step f), the lime used as quick lime directly in the causticization step or the lime used before hydration to constitute hydrated lime, comprises more than 90% calcium oxide (CaO).

13. The method of claim 1, wherein the lime is generated by recycle and calcination of the washed calcium carbonate mud.

14. The method of claim 1, wherein at step f) the lime is quick lime or hydrated lime, and the lime comprises magnesium oxide or magnesium hydroxide wherein the magnesium to calcium molar ratio is less than 0.2 mol/mol.

15. The method of claim 1, wherein the purge stream comprises Na2CO3 and/or NaHCO$_3$ in a quantity of at least 7% TA (Total Alkalinity) expressed as equivalent Na2CO3.

16. The method according to claim 1, wherein the purge stream is a purge derived from a sodium carbonate decahydrate crystallizer, or from a sodium sesquicarbonate crystallizer.

17. The method according to claim 16, wherein the sodium carbonate decahydrate crystallizer, or the sodium sesquicarbonate crystallizer are crystallizers in which a purge from a sodium carbonate monohydrate crystallizer is treated in order to control the sodium chloride and/or the sodium sulfate of the sodium monohydrate crystallizer.

18. A method for producing a sodium carbonate salt or a sodium bicarbonate salt from a sodium carbonate solution or a sodium bicarbonate solution derived from a sodium carbonate ore or a sodium bicarbonate ore selected from the group consisting of: trona, nahcolite, and wegsheiderite ores, or from a sodium carbonate/bicarbonate lake water, or from a reclaimed solid, or from a mine water, said ores, waters or solid comprising sodium carbonate/bicarbonate, comprising the following steps:

a) optionally pre-treating the sodium carbonate solution or the sodium bicarbonate solution in removing part of organics and/or changing the carbonate or bicarbonate molar ratio in order to obtain an optional pre-treated sodium carbonate solution or sodium bicarbonate solution;

b) crystallizing from the sodium carbonate solution or the sodium bicarbonate solution, or from the optionally pre-treated sodium carbonate solution or sodium bicarbonate solution, a sodium carbonate salt or a sodium bicarbonate salt with one of the means selected from the group consisting of:

evaporation crystallization, cooling evaporation, carbonation crystallization and combinations thereof, said crystallization step of the sodium carbonate salt or the sodium bicarbonate salt generating a mother liquor, said mother liquor comprising sodium carbonate or bicarbonate, sodium chloride or sodium sulfate, and water;

c) separating the sodium carbonate salt or the sodium bicarbonate salt from the mother liquor;

d) recycling part of the mother liquor back into one of the step a), or step b) and removing part of the mother liquor in order to generate a purge stream to control the sodium chloride and/or theسodium sulfate concentration in the mother liquor of the crystallization step b), e) producing the concentrated aqueous sodium hydroxide.

19. The method according to claim 18, wherein the sodium carbonate salt is sodium carbonate monohydrate, and wherein the carbonate solution or bicarbonate solution is a trona ore solution mining solution and/or a trona ore mine water and/or a reclaimed solid comprising sodium carbonate, said carbonate solution or bicarbonate solution comprising at least 10% total alkalinity expressed as sodium carbonate and comprising sodium chloride and/or sodium sulfate, wherein:

step a) comprises:

a wet calcination in one or several steps for partly decarbonating the carbonate solution or bicarbonate solution to a sodium bicarbonate content of less than 5 w % NaHCO$_3$, and a water evaporation operation to increase the total alkalinity of the carbonate solution or bicarbonate solution exiting step a) to at least 20% expressed as sodium carbonate, and a caustic calcination for further partly decarbonating the carbonate solution or bicarbonate solution to a sodium bicarbonate content of the carbonate solution or bicarbonate solution exiting step a) to less than 4 w % NaHCO$_3$, using at least partly the sodium hydroxide from the concentrated aqueous sodium hydroxide solution;

step b) comprises crystallizing from the carbonate solution or bicarbonate solution exiting step a), a carbonate salt in the form of sodium carbonate monohydrate salt or a sodium carbonate anhydrous salt with one of the means selected from the group consisting of: evaporation crystallization, cooling evaporation; and step c) comprises separating the sodium carbonate, monohydrate or anhydrous, salt from the mother liquor of step b), and drying and/or calcining the sodium carbonate, monohydrate or anhydrous, salt into dried anhydrous sodium carbonate.

20. The method of claim 18, further comprising recovering water at step a) or at step b) or at step h) as condensates from evaporators and recycling the condensates to a calcined carbonate or bicarbonate ore leaching or to a carbonate or bicarbonate ore solution mining.

\* \* \* \* \*